United States Patent Office 3,242,641
Patented Mar. 29, 1966

3,242,641
PURIFICATION OF POLYMERIZABLE OLEFIN
HYDROCARBONS
Earle C. Makin, Jr., St. Louis, Mo., assignor to Monsanto
Company, a corporation of Delaware
No Drawing. Filed Oct. 24, 1962, Ser. No. 232,866
11 Claims. (Cl. 55—33)

The present invention relates to a process for the purification of polymerizable olefin hydrocarbons. More particularly, the present invention relates to the simultaneous removal of water and other impurities such as oxygen, sulfur and carbon dioxide from polymerizable olefin hydrocarbon feeds.

In many polymerization reactions, it has been found that very small amounts of impurities such as water, oxygen, sulfur and carbon dioxide in the polymerizable olefin hydrocarbon feed can be detrimental both to the polymerization reaction and the polymerization product. Thus, polymerization grade olefin hydrocarbons generally must be entirely or substantially free of these impurities. In most instances, the purification processes which have been used to remove these impurities have comprised at least two separate steps. One or more steps have been used to remove any oxygen, sulfur or carbon dioxide present and then the polymerizable olefins passed through a dessicant to remove water initially present in the olefins or which was formed by the reactions which removed the other impurities.

It is, therefore, an object of the present invention to provide a process for the purification of polymerizable olefin hydrocarbons. Another object of the present invention is to provide a process for the removal of such impurities as oxygen, sulfur, carbon dioxide and water from polymerizable olefin hydrocarbons contaminated with such impurities. More particularly, it is an object of the present invention to provide a single step process for the concurrent removal of water and other impurities such as oxygen, sulfur and/or carbon dioxide from polymerizable olefin hydrocarbons containing such impurities. Additional objects will become apparent from the following description of the invention herein disclosed.

In fulfillment of these and other objects, it has been found that an impure polymerizable olefin hydrocarbon feed containing as impurities water and oxygen and/or sulfur and/or carbon dioxide may be purified of such impurities by contacting the impure polymerizable olefin hydrocarbons with a molecular sieve containing a metal such as copper, silver or lead. This process will remove all or substantially all of the water and any of the other impurities present in the polymerizable olefin hydrocarbons in a single step, thereby reducing substantially the cost of purifying polymerizable olefin hydrocarbons.

The molecular sieves referred to above are crystalline zeolites which occur both naturally and are produced synthetically. These zeolites possess the characteristics of having innumerable internal cavities with interconnecting channels and external entrance pores into these internal cavities. Molecular sieves are further characterized by uniformity of the diameters of the entrance pores and internal cavities. The entrance pores generally may vary in different molecular sieves from 2 to 15 A. and higher, however, any particular molecular sieve will possess entrance pores of a substantially uniform diameter. As synthesized, the molecular sieve crystals contain water of hydration which on heating is driven out thus resulting in a geometric network of internal cavities connected by channels and opening externally by means of pores. The molecular sieve crystalline zeolites vary somewhat in composition, but generally contain the elements silicon, aluminum and oxygen as well as alkali and/or alkaline earth metal elements, e.g., sodium, potassium, etc., and/or clacium, magnesium, etc., and the like. Commercially available molecular sieves are generally synthetic sodium and/or calcium-alumino-silicate crystals. Additional information regarding the composition and method of preparation of molecular sieve crystalline zeolites is presented by Kimberlin and Mattox in U.S. Patent 2,972,643.

To further describe and to demonstrate the present invention, the following examples are offered. It is to be understood, of course, that these examples are in no way to be construed as limiting to the present invention.

*Example I*

Approximately 1000 mls. (637 gms.) of a sodium alumino-silicate molecular sieve in the form of ⅛″ pellets and commercially known as Linde Type 13X molecular sieve was immersed in a solution of 171.8 gms.

$$CuCl_2 \cdot 2H_2O$$

dissolved in 1 liter of water. This molecular sieve has entry pore diameters of approximately 10 Angstroms. The solution was made slightly acid with HCl to prevent hydrolysis of $Cu^{++}$ and to promote ion exchange. To further promote ion exchange the solution containing the molecular sieves was heated on a steam bath for approximately 36 hours. The molecular sieve pellets were then decanted from the solution, dried in an oven for 24 hours at approximately 120° C. and then calcined at 150° C. for 16 hours. The molecular sieve was found to contain approximately 10 percent by weight of copper.

This copper containing molecular sieve is next reduced by passing a stream of hydrogen into contact therewith at 450° C. for approximately 12 hours. The copper containing molecular sieve so prepared is ready for use in purifying polymerizable olefin hydrocarbons.

*Example II*

A high purity ethylene stream containing small amounts of oxygen, sulfur and water as impurities is passed into contact with the copper containing molecular sieve prepared in Example I at a pressure of 450 p.s.i.g., a temperature of 25° C. and at a rate of approximately 500 volumes of gas per volume of molecular sieve per hour. The following table presents an analysis of the ethylene stream before and after contact with the copper containing molecular sieve.

| Component | Prior to Contact | After Contact |
|---|---|---|
| Ethylene, wt. percent | 98.5 | 98.5 |
| Ethane, wt. percent | 1.3 | 1.3 |
| Methane, wt. percent | 0.2 | 0.2 |
| Sulfur, p.p.m. | 10 | 1 |
| Oxygen, p.p.m. | 10 | 0 |
| Water, p.p.m. | 5 | 0 |

*Example III*

An ethylene stream having the composition given in the table below is passed into contact with the copper containing molecular sieve prepared in Example I at a pressure of 450 p.s.i.g., a temperature of 0° C. and at a rate of approximately 500 volumes of gas per volume of molecular sieve per hour. The composition of the feed stream both before and after contact with the copper containing molecular sieve is given in the following table:

| Component | Prior to Contact | After Contact |
|---|---|---|
| Ethylene, wt. percent | 79.0 | 79.0 |
| Ethane, wt. percent | 19.9 | 20.0 |
| Methane, wt. percent | 1.0 | 1.0 |
| Sulfur, p.p.m. | 12.5 | 1 |
| Oxygen, p.p.m. | 10 | 0 |
| Water, p.p.m. | 8 | 0 |
| Carbon dioxide, p.p.m. | 51 | 0 |

It should be noted in this example that the ethylene stream contains significant amounts of sulfur and carbon dioxide as well as oxygen and water and that the sulfur is almost completely removed while the carbon dioxide is completely removed.

*Example IV*

A product propylene stream is passed into contact with the copper containing molecular sieve of Example I at a pressure of 275 p.s.i.g., a temperature of 40° C. and a rate of 500 volumes of gas per volume of molecular sieve per hour. The composition of the product propylene stream both before and after the contact with the copper containing molecular sieves is given in the following table:

| Component | Prior to Contact | After Contact |
|---|---|---|
| Propylene, wt. percent | 55.0 | 55.0 |
| Propane, wt. percent | 43.0 | 43.0 |
| Ethylene, wt. percent | 1.0 | 1.0 |
| Ethane, wt. percent | 1.0 | 1.0 |
| Sulfur, p.p.m. | 15 | 2 |
| Oxygen, p.p.m. | 10 | 0 |
| Water, p.p.m. | 10 | 0 |

*Example V*

Approximately 1000 ml. (660 gms.) of a calcium alumino-silicate molecular sieve in the form of 1/16" pellets is immersed in a solution of 100 gms. of $AgNO_3$ dissolved in one liter of water. This molecular sieve has entry pore diameters of approximately 5 A. The molecular sieve pellets are allowed to remain in the solution until ion exchange is complete and are then decanted from the solution, dried in an oven for approximately 24 hours at 120° C., then calcined at 550° C. for 12 hours. This molecular sieve contains approximately 9 percent by weight of silver. The silver-containing molecular sieve is then reduced in a hydrogen stream at 450° C. for approximately 12 hours.

*Example VI*

Approximately 100 gms. of a sodium-alumino-silicate molecular sieve in the form of 1/16" pellets was immersed in a solution of 13.5 gms. of $Pb(NO_3)_2$ dissolved in 600 mls. of water. This molecular sieve has entry pore diameters of approximately 10 A. The molecular sieve pellets were allowed to remain in the solution until ion exchange was complete and were then decanted from the solution, dried in an oven for approximately 16 hours at 100–110° C., then calcined at 500° C. for several hours. This molecular sieve contained approximately 6 percent by weight of lead. The lead-containing molecular sieve is then reduced in a hydrogen stream at 450° C. for approximately 12 hours.

*Example VII*

Two separate samples of high purity ethylene stream of Example II are passed into contact with the silver-containing molecular sieve prepared in Example V and the lead-containing molecular sieve prepared in Example VI at, in each case, a pressure of 400 p.s.i.g., a temperature of 30° C. and at a rate of approximately 600 volumes of gas per volume of molecular sieve per hour. The following table presents an analysis of the ethylene stream after contact with the silver-containing molecular sieve and the lead-containing molecular sieve.

| Component | After Contact with Ag-molecular sieve | After Contact with Pb-molecular sieve |
|---|---|---|
| Ethylene, wt. percent | 98.5 | 98.5 |
| Ethane, wt. percent | 1.3 | 1.3 |
| Methane, wt. percent | 0.2 | 0.2 |
| Sulfur, p.p.m. | 4 | 0 |
| Oxygen, p.p.m. | 0 | 1 |
| Water, p.p.m. | 0 | 0 |

The molecular sieves useful in the present invention are those containing 1 to 15 percent by weight of a metal selected from the group consisting of copper, silver and lead. It is preferred that the amount of the metal present in the molecular sieve be from 8 to 12 percent by weight of the total composition. The preferred metal to be ion-exchanged into the molecular sieves is copper. Among the molecular sieves useful in the present invention are the alkali and/or alkaline earth metallo-alumino-silicates having surface areas of 200 to 1200 square meters per gram and pore diameters of 2 to 15 A. The preferred molecular sieves are the sodium and/or potassium and/or calcium and/or magnesium-alumino-silicates having pore diameters of 2 to 12 A. Particularly preferred molecular sieves are sodium-alumino-silicate and calcium-alumino-silicate having pore diameters of 3 to 10 A.

The method whereby the metal containing molecular sieves of the present invention are prepared is not critical. However, a particularly useful method is described below. This method comprises totally immersing the molecular sieve in an aqueous solution of a salt of either one or a mixture of the metals desired for use in the present invention dissolved in a suitable solvent. Heat may be applied if necessary to cause the ion-exchange reaction to go forward more rapidly. Also, the solution may be made slightly acidic in order to further promote the ion-exchange reaction. Generally, it is unnecessary to use either heat or an acidic solution in order to promote the ion-exchange reaction since the reaction proceeds very well without external stimulus. After the ion-exchange reaction has gone to completion, the molecular sieve is filtered or otherwise removed from the solution. It is then thoroughly dried, preferably at moderately low temperatures, e.g., 100 to 350° C. for several hours. Care should be taken to avoid high temperature, e.g., greater than 600° C. which might cause damage to the crystalline structure of the molecular sieve. After drying, the ion-exchange molecular sieve is generally calcined for several hours at a temperature of from approximately 100 to 650° C. in the presence of an oxygen containing gas such as air, oxygen or mixtures thereof. After calcination, the ion-exchanged molecular sieve is reduced for several hours in the presence of a reducing gas such as hydrogen at a temperature of from approximately 200 to 600° C. After reduction, the metal containing molecular sieve is ready for use in the present process.

The above method of preparation contemplates the use of prepared molecular sieve crystalline zeolites. If it is desired to prepare the zeolite rather than obtain one already prepared, any of the conventional methods of preparation may be used. Among these conventional known methods are those described in U.S. Patent 2,972,643.

The temperatures at which the present purification process is generally found most operable are within the range of from approximately 0° to 200° C. It is preferred, however, that the temperature be maintained within the range of 0 to 80° C.

In operating the present invention, pressures ranging from approximately atmospheric pressure up to the pressure at the dew point at the above temperatures of the olefin being purified may be used. It is preferred, however, that the pressure be maintained within the range of from approximately 200 to 500 p.s.i.g.

The rate at which the impure polymerizable olefin feed is passed into contact with the metal containing molecular sieve is not particularly critical to the practice of the present invention. A rate of 300 to 1500 gaseous volumes of feed per volume of metal containing molecular sieve per hour is found to be very useful. It is preferred that this rate be maintained within the range of 500 to 1000 gaseous volumes of feed per volume of metal containing molecular sieve per hour.

The olefin hydrocarbons which may be purified using the present invention may be any of those normally classed as polymerizable olefin hydrocarbons. This includes both mono and di-olefin hydrocarbons. Such hydrocarbons include ethylene, propylene, butylene, pentene, hexene, heptene, etc., on up to and including dodecene and higher propadienes, butadienes, pentadienes, hexadienes, etc. The polymerizable olefins include both n- and iso-olefins. The present invention finds its greatest utility, however, in the purification of the normally gaseous polymerizable mono-olefin hydrocarbons such as ethylene, propylene, butylenes and mixtures thereof.

The impurities for which the present invention provides a method for removing from polymerizable olefin hydrocarbon streams are water and an impurity such as oxygen, sulfur and carbon dioxide. The present invention finds its greatest utility in the removal of oxygen and small amounts of water. This preferred utility is not based upon any limitation upon the process of the present invention itself but rather oxygen and water are the most common impurities found in polymerizable olefin hydrocarbons. The primary advantage gained by the present invention is the concurrent removal of water and other impurities such as oxygen. In its most useful application, the present invention is directed to the removal of impurities from the polymerizable olefin streams in which the impurities are present in amount less than 500 p.p.m. of each impurity. As is demonstrated by the examples, it finds its greatest efficacy in the removal of impurities present in quantities less than 25 p.p.m. Since the moisture is retained within the intercrystalline cavities of the molecular sieve the greater the amount of moisture present in the impure feed the shorter the purification cycle will be and the more often it will be necessary to purge the molecular sieve of adsorbed moisture.

Periodically, it will be necessary to regenerate the metal containing molecular sieves. This is done by removing the water from the molecular sieve and thereafter or concurrently with reactivating the catalytic activity of the molecular sieve. Water may be removed from the molecular sieve by heating at an elevated temperature, preferably while passing a gas over the molecular sieves. The catalytic activity may be restored by passing a reducing gas such as hydrogen over the metal containing molecular sieves at an elevated temperature. The method of regeneration of the catalyst is not critical to the present invention, therefore the above description of regeneration is merely exemplary and is not limiting.

The method by which the impure polymerizable olefin hydrocarbon feed is contacted with the metal containing molecular sieves is not particularly critical to the present invention. The process may be one involving gas-solid or liquid-solid contact. The metal containing molecular sieves may be used in a stationary or fluidized bed. If fluidized, the molecular sieves may be in the form of a dry powder or pellets or may be slurried in an appropriate liquid. The arrangement and design of the apparatus is not particularly critical to the present process so long as good engineering principles are followed.

What is claimed is:

1. A process for the purification of polymerizable olefin hydrocarbons containing as impurities water and oxygen which comprises contacting said polymerizable olefin hydrocarbons with a molecular sieve selected from the group consisting of alkali metallo-alumino-silicates and alkaline earth metallo-alumino-silicates wherein at least a portion of the alkali and alkaline earth ions have been replaced by ion exchange with a metal selected from the group consisting of copper, silver and lead, at a temperature of approximately 0 to 200° C. and a pressure of from atmospheric pressure to the pressure at the dew point of the polymerizable olefin hydrocarbons at the temperature of operation and recovering said polymerizable olefins substantially free of said impurities.

2. The process of claim 1 wherein the metal contained within the molecular sieve is copper.

3. The process of claim 1 wherein the metal contained within the molecular sieve is silver.

4. The process of claim 1 wherein the metal contained within the molecular sieve is lead.

5. The process of claim 1 wherein the temperature is within the range of 0 to 80° C.

6. The process of claim 1 wherein the pressure is within the range of from approximately 200 to 500 p.s.i.g.

7. The process of claim 1 wherein the olefin hydrocarbons are selected from the group consisting of ethylene, propylene, butylenes and mixtures thereof.

8. The process of claim 1 wherein the polymerizable olefin hydrocarbons are contacted with the metal containing molecular sieve at a rate of from approximately 300 to 1500 gaseous volumes of polymerizable olefins per volume of metal containing molecular sieve per hour.

9. The process of claim 1 wherein the metal containing molecular sieve is prepared by immersing molecular sieve in a solution of a salt of a metal selected from the group consisting of copper, silver and lead until ion-exchange is complete, removing the molecular sieve from the solution, drying the molecular sieve, thereafter calcining the metal containing molecular sieve at a temperature of from approximately 100 to 650° C. and subsequently reducing the metal containing molecular sieve in the presence of a reducing gas at a temperature of 200 to 600° C.

10. The process of claim 1 wherein the molecular sieve is one having a surface area of 200 to 1200 square meters per gram and a pore diameter of 2 to 15 A.

11. The process of claim 1 wherein the alkali ions are selected from the group consisting of sodium and potassium and wherein the alkaline earth ions are selected from the group consisting of calcium and magnesium.

References Cited by the Examiner

UNITED STATES PATENTS

| | | | |
|---|---|---|---|
| 2,837,587 | 6/1958 | Hogan et al. | 252—476 X |
| 2,882,243 | 4/1959 | Milton | 55—75 |
| 2,885,368 | 5/1959 | Hess et al. | 252—449 X |
| 2,971,904 | 2/1961 | Gladrow et al. | |
| 3,078,639 | 2/1963 | Milton | 55—68 |
| 3,078,640 | 2/1963 | Milton | 55—73 |

FOREIGN PATENTS 1,136,990   9/1962   Germany.

OTHER REFERENCES

"Examine These Ways to Use Selective Adsorption," Petroleum Refiner, vol. 36, No. 7, July 1957, pps. 136–140.

Robert A. Jones, "Molecular Sieves," Advances in Petroleum Chemistry and Refining, vol. IV, ps. 115–161, November 1961 (pps. 143–150 relied on).

REUBEN FRIEDMAN, *Primary Examiner.*

C. N. HART, *Assistant Examiner.*